INVENTOR.
EDWARD L. EMBLER
BY JAMES R. PROFFITT JR.
D. R. Birchall
W. A. Schaich
ATTORNEYS United States Patent Office 3,553,771
Patented Jan. 12, 1971

3,553,771
APPARATUS FOR COMPACTING
THERMOSETTING MATERIAL
Edward L. Embler and James R. Proffitt, Jr., Erie, Pa., assignors to Owens-Illinois, Inc., a corporation of Ohio
Filed June 4, 1968, Ser. No. 734,404
Int. Cl. B30b 11/14
U.S. Cl. 18—4
13 Claims

ABSTRACT OF THE DISCLOSURE

An apparatus for metering the precise quantities of a thermosetting resin and compacting the same while under the influence of a high-frequency heat source such as radio frequency energy. A mold cavity is filled with a plastic charge, loosely compacted and then moved to a dielectric heating zone where additional compaction is imposed upon the plastic charge. Subsequent to compaction the plastic charge is redelivered to the initial filling zone and removed from the mold for immediate use in an article producing press.

Figures 1, 2:
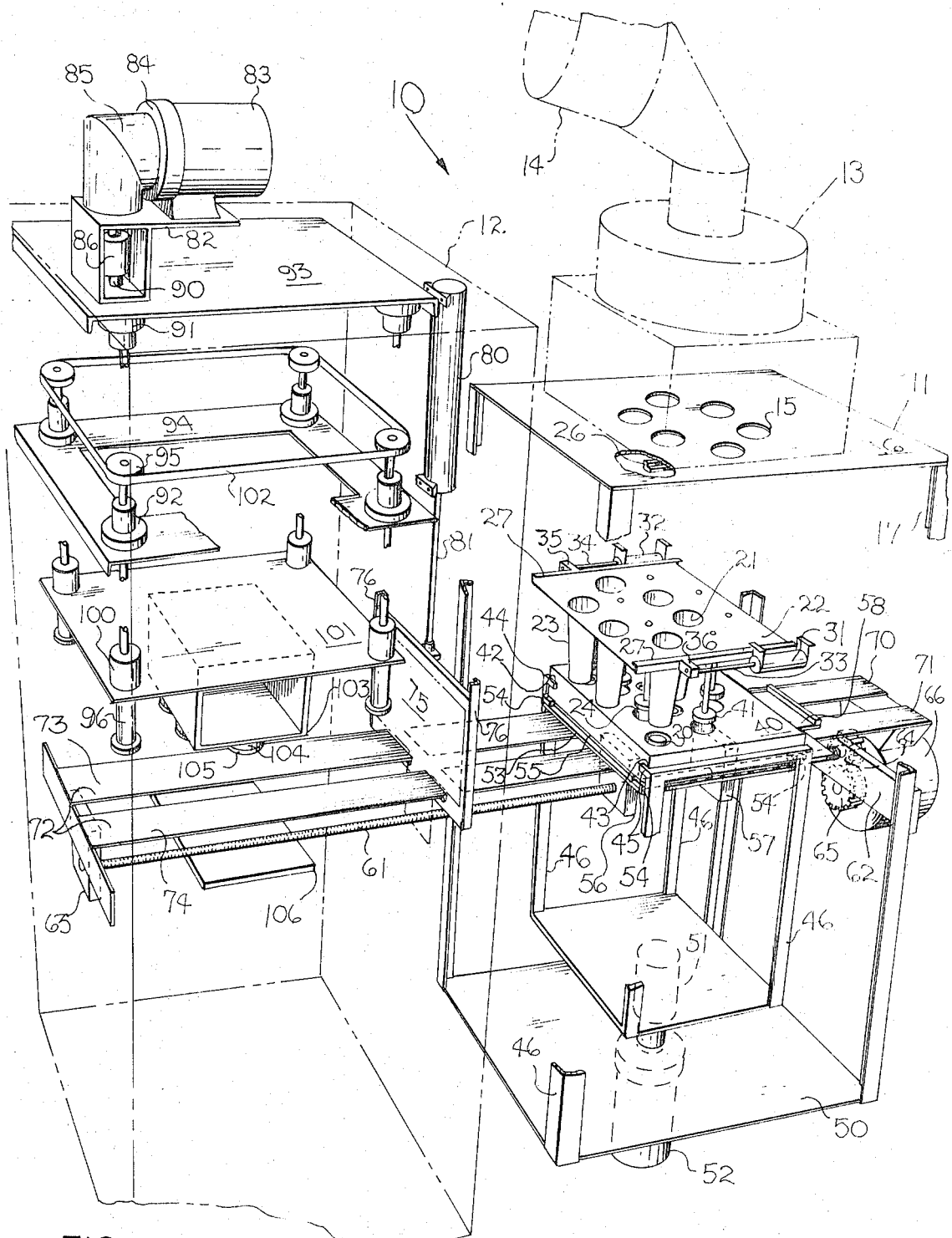

This invention relates to molding thermosetting plastics and particularly to molding melamine resins and the like. The invention is directed to the problem of molding resin preforms that are subsequently introduced into a press for shaping to final configuration.

In accordance with the present invention, predetermined charges of granular or powered thermosetting material such as for example, melamine resin, are introduced into one or more cavities within a nonmetallic mold. While within the confinement of the mold, the resin is subsequently heated by high-frequency electrical energy while being subjected to a compacting pressure. The combination of heat and pressure produces melamine resin preforms that are then removed from the mold cavity or cavities and used immediately in a press containing a final configuration mold to produce desired melamine resin articles such as tableware, trays, and similar articles.

THE PRIOR ART

A previously developed technique for manufacture of melamine resin preforms has been described in U.S. patent application Ser. No. 503,420 filed Oct. 23, 1965, and now Pat. No. 3,389,427, issued June 25, 1968. In the aforementioned patent application, an essentially three-stage apparatus is set forth. The first stage comprises a melamine resin metering station where the granular resin is delivered to a mold containing a plurality of preform cavities each receiving an essentially equal quantity of resin. After the preform cavities are filled with individual charges of resin, the mold assembly containing the preform cavities is then moved to a second stage heating and compaction zone where the granular resin is subjected to heat producing electrical energy and also to some compressive force resulting from the weight of the overall structure associated with the heating mechanism. When the heated granular melamine resin has been partially compacted, the mold assembly is additionally moved to a third stage where the partially compacted melamine resin preforms are further compacted and then are ejected from the preform cavities of the mold.

As has been pointed out above, the prior art apparatus involved three distinct stages or steps through which the melamine preforms had to be processed before they could be utilized in a final configuration mold and press combination. The present invention is an improvement upon the prior art in that only two distinct stages are required to accomplish the same result as the prior art three-stage apparatus. Also, in the prior art apparatus the preforms were created in the first stages most remote from the operator and the final configuration press. The preforms, then, were moved toward the operator and the press to the second stage of the apparatus where heating and partial compaction occurred. Finally, the preforms were moved to stage three of the apparatus for final compaction and ejection. In order to initiate the formation of the preforms, the operator was obliged to walk to the rear of the apparatus to oversee the initial charges of melamine resin utilized in the preforms.

The two-stage apparatus which comprises the present invention creates the resin preforms in the first stage of the apparatus which is adjacent to the operator. The preforms are then moved to a second stage where they are heated and compacted to final confiuration. From the second stage the preforms are moved back to the first stage position where they are ejected from the preform mold cavities. The completed preforms as produced by the present are quite accessable to the operator who does not have to move from his original position in order to retrieve the preforms for insertion into a press that forms the completed article.

OBJECTS AND SUMMARY OF THE INVENTION

In recognition of the inherent deficiencies of the prior art method and apparatus utilized in the preforming of granular or powdered melamine resin, it is a primary object of the present invention to provide a new apparatus which enables melamine resins to be formed into suitable preformed masses with a minimum number of steps and which facilitates easy handling and accessibility for immediate use in the production of pressed ware.

Another important object of the present invention is to provide an apparatus with a stage that serves to initially fill the preform cavities with a particulate resin and which also serves as an ejection stage.

An additional object of the present invention is to provide an apparatus of making preforms for pressed ware by heating and compacting the particulate material at the same stage of the apparatus.

Yet another object of this invention is to provide a method whereby melamine resin preforms are created at a first location, translated to a second location for compaction and redelivered to the first location for final use.

Additional objects of the present invention will become readily apparent when the contents of this specification are examined in conjunction with the drawings, which are by way of illustration and not of limitation, and the appended claims attached hereto.

IN THE DRAWINGS

FIG. 1 is a perspective view of the two-stage particulate heating and compacting machine of the present invention; and FIG. 2 is cross-sectional view through two of the cavities of the preform mold block.

A brief description of the present invention as shown in the drawings is set forth in this paragraph. Referring now to FIG. 1, the overall apparatus is represented by numeral 10. The apparatus is divided into two parts identified as a metering section 11 on the right-hand side of FIG. 1 and a heating section 12 positioned adjacent to and on the left-hand side of FIG. 1. Granular or powdered melamine resin or, for that matter, other similar thermosetting particulate material is fed into the top of metering section 11. The granular resin is then divided into a plurality of charges of equal volume within metering section 11. It is, of course, to be understood that the number of cavities within the apparatus can be as low as one should it be desired to produce large articles such as trays. A greater number of cavities will be dictated by article size. In order to illustrate the invention, a plurality of cavities are referred to in the drawings and specification. The plurality of charges are then deposited into a non-metallic preheating block 40 which can be moved from metering section 11 where it has been filled, to heating section 12 where heat and pressure are applied to the individual charges. After the charges have been compacted, the preheating block 40 is returned to its original position within metering section 11. The melamine resin charges are then disengaged from preheating block 40 and are thus ready to be moved by the operator from metering section 11 to a nearby finished ware press which is, of course, not part of this invention.

DETAILED DESCRIPTION OF APPARATUS

Continuing with the description of the present invention in greater detail, reference is again made to FIG. 1. A melamine resin feeding and dispensing apparatus is mounted on the top of metering section 11. Granular resin flows from barrel 14 into dispensing apparatus 13 where the resin is permitted to flow into individual measuring compartments (not shown). Both barrel 14 and dispensing apparatus 13 are shown in broken lines and a complete description thereof can be had by referring to the prior art commented upon at the beginning of this specification.

The individual metered charges of melamine resin fall from dispensing apparatus 13 through apertures 15 in support floor 16 of metering section 11. Apertures 15 are in alignment with the individual measuring compartments located within measuring apparatus 13. Support floor 16, upon which dispensing apparatus 13 is mounted, is attached to the top of framework 17. Framework 17 forms the exterior support structure for metering section 11.

As the precisely measured quantities of melamine resin are released through apertures 15 in support floor 16, they pass through inlet apertures 21 in shuttle plate 22. Coupled in direct alignment with apertures 21, are conical shaped conveyor tubes 23. The resin charges are directed by conical conveyor tubes 23 into cylindrical cavities 24 of preheating block 40. Conveyor tubes 23 may be constructed from a flexible material so that they will collapse or else they may be accommodated by relief cavities such as shown at 20.

Returning to shuttle plate 22, slide tracks 26 are attached by any conventional means to the bottom side of support floor 16. Complementary rails 27 are positioned in parallel orientation along two top edges of shuttle plate 22. Thus it can be seen that shuttle plate 22 can move linearly while being supported from the under side of support floor 16. The linear motion of shuttle plate 22 is controlled by actuators 31 and 32 which are attached to the bottom side of support floor 16 (actual attachment not shown). The piston rods 33 and 34 of actuators 31 and 32 are coupled to lugs 35 and 36 which are attached to and positioned on both sides of shuttle plate 22. Actuators 31 and 32 may be either hydraulic or pneumatic and are coupled together control-wise so that they will act in unison.

When piston rods 33 and 34 are in the retracted position, shuttle plate 22 is in position directly over preheating block 40 with conical conveyor tubes 23 in direct axial alignment with cylindrical cavities 24. As piston rods 33 and 34 are moved to the extended position, conical conveyor tubes 23 are moved out of axial alignment with cylindrical cavities 24 and ejector pads 41 are moved into axial alingment with cylindrical cavities 24. Ejector pads 41 are attached in cantilevered fashion from the bottom surface of shuttle plate 22. The ejector pads 41 and their function will be commented upon at a later part of this specification.

Attention is now directed to preheating block 40 and the various parts of metering section 11 that are immediately adjacent thereto. Preheating block 40 is shown in FIG. 1 and is also shown in more detail in FIG. 2. Preheating block 40 is made from a non-dielectric material preferably of plastic compositions such as polyethylene or tetrafluorethylene. A selected number of cylindrical cavities 24 are contained within preheating block 40. Cylindrical cavities 24 are open at the top and the bottom. Two grooves 42 and 43 are positioned, one at each side, along parallel sides of preheating block 40. Grooves 42 and 43 are shown in the cross-sectional view of preheating block 40 as shown in FIG. 2. Also shown in FIG. 2 are inserts 47 which form the sidewalls of cylindrical cavities 24. Inserts 47 are preferably of plastic composition and may be held within preheating block 40 by threads, snap rings, or other conventional fastening means. The use of inserts 47 within preheating block 40 provides an open space 48 between insert 47 and the main portion of preheating block 40 thus causing a reduction in heat transfer from the melamine resin. The reduction in heat transfer from the melamine resin prolongs the condition of a homogeneously heated preform for a longer period of time. In addition, the basic interface 49 at the top section of insert 47 also reduces heat transfer thus permitting a faster warm-up to ambient temperatures which is a factor in reducing offware.

Referring once again to FIG. 1, it can be seen that ejector guide bars 44 and 45 coact with grooves 42 and 43 of preheating block 40. Ejector guide bars 44 and 45 are in turn supported by upright members 46. The lower ends of upright members 46 are securely attached to ejection cylinder mounting plate 50. Mounting plate 50 is supported from the end of piston rod 51 which is extendable in a vertical direction from ejection cylinder 52. Cylinder 52 is mounted in a rigid fashion from any suitable location associated with the lower framework of overall apparatus 10. When piston rod 51 is extended, mounting plate 50, upright members 46, and ejector guide bars 44 and 45 all move in an upward direction. Preheating block 40 is thus moved in an upward direction as a result of the biasing force supplied by ejector cylinder 52.

Preheating block 40 rests upon block traverse tray 53 and is kept within lateral alignment by guide blocks 54. Guide blocks 54 are attached to the top four corners of block traverse tray 53. Preheating block 40 is not anchored to block traverse tray 53. Interdisposed between block traverse tray 53 and preheating block 40 is preheating tray 55. The handle portion 58 of preheating tray 55 can be seen to the right of preheating block 40. Preheating tray 55 forms a bottom for the cylindrical cavities in preheating block 40. Preheating tray 55 is not attached to block traverse tray 53 or preheating block 40. The preheating tray 55 is merely resting upon block traverse tray 53 and in turn supports the entire weight of preheating block 40.

In addition to the vertical movement capacity possessed by preheating block 40, it can be moved in a lateral direction between the metering section 11 of overall apparatus 10 and heating section 12 which is adjacently positioned with respect to metering section 11. The block traverse tray 53, upon which rests the preheating tray 55 and the preheating block 40, is attached to two ball screw nuts 56 and 57. Ball screw nuts 56 and 57 are engaged by means of complementary threads with traverse ball screw 61. Ball screw 61 is supported on the front or metering section 11 side by front bearing housing 62 which is shown as an integral part of framework 17 and on the heating section 12 side by rear bearing housing 63. The bearing housing 63 is also anchored to the framework of overall apparatus 10. The front terminal of traverse ball screw 61 is keyed to a gear 64 which meshes with drive gear 65 of brakemotor 66. Brakemotor 66 is supported in rigid fashion from the overall apparatus 10 framework.

As the traverse ball screw 61 rotates under the rotational driving influence of brakemotor 66, ball screw nuts 56 and 57 will be propelled along the axial extent of traverse ball screw 61. Since the block traverse tray 53 is attached to ball screw nuts 56 and 57, it too will move along the axial extent of traverse ball screw 61. Thus it can be ascertained that the preheating block 40 can be moved from the metering section 11 to the heating section 12 and back again by the forward and reverse rotational force supplied by brakemotor 66. The block traverse tray 53 slides along spaced apart support plates 70 and 71 while it is within the confinement of metering section 11. The space between support plates 70 and 71 permits ball screw nuts 56 and 57 to move along the axial extent of traverse ball screw 61.

A similar support arrangement for the guidance and support of the block traverse tray 53 is provided for in heating section 12. The radio frequency preheater floor 72 is divided into two support plates 73 and 74 similar to support plates 70 and 71 in the metering section 11. Interdisposed between metering section 11 and heating section 12 and attached to heating section 12 is preheater door 75. Appropriate door guides 76 are positioned on both sides of door 75. Actuator 80 is anchored to the framework of heating section 12 and by means of its movable piston rod 81, door 75 is raised and lowered.

Heating section 12 is primarily constructed to house the radio frequency dielectric heating portion of the present invention. At the extreme top of heating section 12, a suitable motor mount 82 is attached to the primary framework of heating section 12. A reversible direction brakemotor 83 is supported from motor mount 82. A hydraulic coupling 84 is attached to the shaft of brakemotor 83. A right angle drive unit 85 is attached to the horizontally disposed connector of hydraulic coupling 84. The other end of the right angle drive unit 85 is disposed in a vertical direction and is attached through shaft connector 86 to drive shaft 90. Drive shaft 90 is supported in a vertical position by upper bearing 91 and lower bearing 92. Upper bearing 91 is attached to the underside of horizontal support member 93 which in turn is attached to the framework of heating section 12. Likewise lower bearing 92 is attached to the top surface of horizontally disposed frame member 94. Frame member 94, like support member 93, is attached to the framework of heating section 12. Sprocket 95 is disposed along the central region of drive shaft 90 and positioned between upper and lower bearings 91 and 92. A ball screw 96 is attached to the lower end of drive shaft 90. Working in conjunction with and positioned on ball screw 96 is ball screw nut 100. Ball screw nut 100 is secured to driven preheater mounting plate 101. The driven preheater mounting plate 101 is also supported by additional ball screw nuts similar to ball screw nut 100 which are mounted on ball screws all activated by a commonly shared timing belt 102.

The actual radio frequency electrical preheating tube and coils (not shown) are located in the box structure 103 which is attached to the bottom side of preheater mounting plate 101. The radio frequency electrical energy is concentrated into a plurality of charges corresponding to the number of cylindrical cavities 24 that are contained in preheating block 40. The concentration of the radio frequency electrical energy is achieved through cylindrical radio frequency pads 104. Cylindrical radio frequency pads 104 are mounted on the lower external surface of box structure 103. Because of their electrical conductivity, the radio frequency electrical energy is focused or concentrated along the conductive paths provided by radio frequency pads 104. The lower ends of radio frequency pads 104 are tipped with squeeze pads 105 manufactured from a non-dielectric plastic material. Squeeze pads 105 are attached to radio frequency pads 104 by mechanical or adhesive means. Co-acting with top positioned radio frequency pads 104, is lower radio frequency grid or plate 106. The dielectric field is established between top radio frequency pads 104 and lower ground plate 106. If desired lower plate 106 can be constructed as an integral part of radio frequency heater floor 72 or be positioned above or below floor 72. The principle of radio frequency electrical or dielectric heating is well known to those skilled in the art and will thus not be described herein.

OPERATION OF INVENTION

At the beginning of each cycle the various components of overall apparatus 10 are in the following positions. Within heating section 12 the upwardly and downwardly driven preheater mounting plate 101 is retracted to its uppermost position within heating section 12. The door 75 between heating section 12 and metering section 13 is in the raised position so that the block traverse tray 53 may pass freely therethrough. The block traverse tray 53 is at its forward-most position within metering section 11. The preheating block 40 is in the raised position while shuttle plate 22 is in the eject position. A cleaned preheating tray 55 is installed on top of the block traverse tray 40 just beneath raised preheating block 40. A plurality of metered charges of melamine resin is gravitationally processed within dispensing apparatus 13 and is held ready for discharge.

The initiation and running of the entire cycle which, it will be appreciated, is controlled by ordinary timing mechanisms coupled and associated with electrical, and pneumatic power sources all readily known to those skilled in the art of machine design. The actual controls, limit switches, relays, etc. have not been shown for the sake of brevity. The ejection cylinder 52 is caused to withdraw its piston rod 52 thus lowering preheating tray 40 down upon the previously installed preheating tray 55. The shuttle plate 22 which is positioned immediately over preheating tray 40 is moved to the forward position by means of actuators 31 and 32. Note that in FIG. 1 the shuttle plate 22 is in the rear position. In the forward position shuttle plate 22 brings attached conical conveyor tubes 23 into axial alignment with cylindrical cavities 24 of preheating block 40. The already metered charge of melamine resin is then deposited into the several cavities within preheating block 40. The shuttle plate 22 shifts to its rearward position in preparation for the next portion of its cycle. At the same time shuttle plate 22 is shifting to its rearward position, brakemotor 66 is energized and begins to move block traverse tray 53 toward the heating section 12. Upon reaching the proper position directly under the preheating tube and coil area identified as box structure 103, the block traverse tray 53, the preheating tray 55, and preheating block 40 are stopped by an appropriate electrical signal supplied to brakemotor 66. While in the above-described position, the squeeze pads 105 and accompanying radio frequency pads 104 are concentrically aligned above cylindrical cavities 24 of preheating block 40.

At the beginning of the preheating cycle, preheater door 75 is lowered to the closed position and power to the radio frequency tubes and coils (not shown) is turned on simultaneously with the energizing of the brakemotor 83 which is mounted on top of heating section 12 and which drives the movable preheater plate 101. The preheater plate 101 and attached squeeze pads 105 are driven in a downward direction and into contact with the granular melamine charges within cylindrical cavities 24 of preheating block 40. As the melamine resin is being compacted the radio frequency electrical energy becomes more concentrated in the space between radio frequency pads 104 and lower plate 106; hence, the heat level rises rapidly within the melamine resin contained within cavities 24 of preheating block 40. It is, of course, desirable to utilize an electrical control which maintains the radio frequency energy level at its highest operating level in order to heat the melamine resin to molding temperature as fast as possible. After a short period, the melamine softens and the granular modules within the structure assume a more intimate contact with themselves under the influence of the pressure applied by the downwardly biased squeeze pads 105. As compaction increases the rate at which dielectric energy can be absorbed also increases. Should the rate of energy absorption of the melamine resin increase to the preset level of preheater's output, and should there be danger of overheating the melamine charge, the preheat-squeeze brakemotor 83 is stopped and reversed. The preheater mounting plate 101 along with its attached parts is then raised until a preset level of reduced dielectric energy absorption is reached. The position of the preheater mounting plate 101 and coupled parts is maintained at this level until the end of the preheating cycle or until the dielectric energy absorption has dropped below its minimum operating level thus reducing the temperature of the melamine resin in which case the preheater mounting plate 101 is lowered to bring the overall temperature back up to the minimum operating level.

Upon completion of the preheating of the melamine charges within preheating block 40, the preheater mounting plate 101 is lowered once again and the granular melamine charges are compacted without the aid of the radio frequency electrical energy for a preset time limit to insure that a homogeneously compacted and preheated preform is produced free of loose grains of melamine resin which could ultimately lead to subsequent molding defects. At the completion of the final compaction time limit, the preheater mounting plate 101 is raised to its upper limit thus extricating squeeze pads 105 and radio frequency pads 104 from the confinement of cylindrical cavities 24 of preheater block 40. At this time preheater door 75 is moved to its upward position and the block traverse tray 53 is propelled by traverse ball screw 61 to its forwardmost position beneath the shuttle plate assembly 22 of metering section 11.

The ejector pads 41, which cantilever downward from the bottom surface of shuttle plate 22, are already in position directly over cylindrical cavities 24 of preheater block 40. Ejection cylinder 52 is then caused to move piston rod 51 to its extended position thus raising preheater block 40 upward against stationary ejector pads 41. As ejector pads 41 move relative to cylindrical cavities 24, the compacted melamine charges are ejected from preheater block 40 and fall a slight distance onto preheating tray 55. The operator then withdraws the preheating tray 55 and proceeds to transport the tray 55 and the compacted melamine charges to a molding press where the preforms are deposited in mold cavities for pressing to final configuration such as, for example, cups, saucers, and plates.

While certain representative embodiments and details have been shown for the purpose of illustrating the invention, it will be apparent to those skilled in the art that various changes and modifications may be made therein without departing from the spirit or scope of the invention.

What is claimed is:

1. In combination an apparatus for the manufacture of preforms comprised of plastic material including a metering section and a heating section, a mold constructed from a material having a low dielectric loss factor, at least one mold cavity located in said mold, conveyor means for moving said mold between the metering section and the heating section, means included within the metering section for introducing a predetermined charge of plastic material into said mold cavity, means included within the heating section for applying pressure to the charge of plastic material within said mold cavity, means for heating said plastic material while it is located within said mold cavity and within the confinement of said heating section, means for applying additional pressure to said plastic material while it is within the confinement of said heating section to form a preform, means within said metering section for stripping the compacted preforms from said mold cavity, and means for operating the various elements of the apparatus in sequential order.

2. In combination an apparatus for the manufacture of preforms comprised of a plastic material including a metering sections adjacently disposed with respect to a heating section, a mold constructed from a material having a low dielectric loss factor, at least one mold cavity positioned within said mold, said cavity having a top aperture and a bottom aperture, conveyor means interconnected between said metering and heating sections for moving said mold therebetween, plastic material ingress means included within the metering section for introducing a predetermined charge of plastic material into said mold cavity through the top aperture thereof, means included within the heating section for applying pressure to the charge of plastic material within said mold cavity, means for dielectrically heating said plastic material while it is located within said mold cavity and within the confinement of said heating section, means for applying additional pressure to said plastic material after it has been heated the required amount and while it is within the confinement of said heating section, and means associated with said plastic material ingress means for stripping the compacted plastic preforms from said mold cavity and means for operating the various elements of the apparatus in sequential order.

3. In combination an apparatus for the manufacture of preforms comprised of a thermosetting plastic material including a metering section contiguously disposed with respect to a heating section, said sections being interconnected one with the other, a mold constructed from a plastic material having a low dielectric loss factor, at least one mold cavity positioned within said mold, said cavity having a top aperture and a bottom aperture, conveyor means interconnected between said metering and heating sections for moving said mold to and from said sections, movable plastic material ingress means included within the metering section and oriented above said mold for introducing a predetermined charge of plastic material into said mold cavity through the top aperture thereof, means included within the heating section for applying pressure to the charge of thermosetting plastic material within said mold cavity, means for dielectrically heating said plastic material while it is located within said mold cavity and within the confinement of said heating section, means for applying a final pressure to said plastic material after it has been heated the required amount and while it is within the confinement of said heating section, and means associated with said platic material ingress means for stripping the compacted plastic preforms from said mold cavity and means for operating the various elements of the apparatus in sequential order.

4. The combination set forth in claim 3 wherein the movable plastic material ingress means comprises a plate-like structure mounted in horizontally disposed slides and connected to at least one biasing means, at least one material directing annular member connected to and disposed generally normal to the underside of said plate-like structure, at least one substantially rigid ejector pad mounted in cantilevered fashion from the underside of said plate-like structure so that the material directing annular member and the rigid ejector pad can be alternately brought into axial alignment with the cavity in said mold when said mold is positioned therebeneath.

5. The combination set forth in claim 3 wherein means is provided for raising and lowering the mold within the metering section so that relative motion can be attained between the stripping means and the mold cavity.

6. The combination set forth in claim 3 wherein the pressure applying means and the dielectric heating means are mounted on the same structure which can be biased toward and away from and in a direction axially with respect to the mold cavity.

7. The combination set forth in claim 3 wherein the conveyor means comprises a screw drive assembly interdisposed between said metering and heating sections, said screw drive assembly powered by reversible motor means, a support tray attached to said screw drive so that it may be propelled along the traverse of said screw drive, said support tray adapted to hold said plastic mold.

8. In combination an apparatus for the manufacture of preforms comprised of a thermosetting plastic material including a metering section contiguously disposed with respect to a heating section, said sections being interconnected one with the other, a mold constructed from a plastic material having a low dielectric loss factor, at least one mold cavity positioned within said mold, said cavity being of annular configuration with a top aperture and a bottom aperture, a conveyor comprising a screw drive assembly powered by a reversible motor, said conveyor interdisposed between said metering and heating sections, a support tray attached to said screw drive, said support tray adapted to hold said plastic mold, a movable plastic material ingress dispensing plate mounted for horizontal movement and connected to at least one actuator capable of moving said plate, at least one material directing annular member connected to said dispensing plate, at least one substantially rigid ejector pad mounted in cantilevered fashion from the underside of said dispensing plate, dielectric heating means located within said heating section including pressure applying means, said heating means and pressure applying means adapted to be moved normal to the mold and axially with respect to the mold cavity, means positioned in said metering section for raising and lowering the mold so that relative motion can be obtained between the ejector pad and the mold cavity.

9. The combination claimed in claim 8 wherein an article handling tray is interdisposed between said support tray and said mold.

10. The combination claimed in claim 8 wherein a movable door is interdisposed between said heating and metering sections.

11. The combination as claimed in claim 8 wherein an insert is positioned within the annular cavity in said mold.

12. The combination as claimed in claim 8 wherein the dielectric heating means has attached thereto an annular metallic member for condensing and directing radio frequency energy into said mold cavity.

13. The combination as claimed in claim 12 wherein a plastic compression pad is attached to the end of said metallic member, said pad coming into contact with the plastic resin within said mold cavity.

References Cited
UNITED STATES PATENTS

| | | | |
|---|---|---|---|
| 2,359,674 | 10/1944 | Pollock | 18—16FX |
| 3,153,262 | 10/1964 | Steketee | 18—16F |
| 3,179,998 | 4/1965 | Lamb | 18—16FX |
| 3,193,874 | 7/1965 | Jablonski | 18—4P |
| 3,222,748 | 12/1965 | Lamb | 18—16FX |
| 3,289,252 | 12/1966 | Ferris | 18—16F |
| 3,389,427 | 6/1968 | Reyburn | 18—4P |

J. HOWARD FLINT, Jr., Primary Examiner

U.S. Cl. X.R.

18—2, 36, 38, 16F; 264—119